United States Patent [19]
Wengrovius et al.

[11] Patent Number: 4,863,992
[45] Date of Patent: Sep. 5, 1989

[54] POLYALKOXYSILYL-TERMINATED POLYDIORGANOSILOXANES, METHODS FOR THEIR PREPARATION, AND ROOM TEMPERATURE VULCANIZABLE COMPOSITIONS CONTAINING THEM

[75] Inventors: Jeffrey H. Wengrovius; John E. Hallgren, both of Scotia; Judith Stein, Schenectady; Gary M. Lucas, Scotia, all of N.Y.

[73] Assignee: General Electric Company, Schenectady, N.Y.

[21] Appl. No.: 225,992

[22] Filed: Jul. 29, 1988

Related U.S. Application Data

[63] Continuation-in-part of Ser. No. 90,183, Aug. 27, 1987, abandoned.

[51] Int. Cl.$^4$ .................................................. C08K 5/24
[52] U.S. Cl. ............................... 524/731; 528/18; 528/21; 528/34; 524/188; 524/267; 524/783; 524/785; 524/788; 524/789
[58] Field of Search ............................ 528/34, 18, 21; 524/731, 188, 267, 783, 785, 788, 789

[56] References Cited

U.S. PATENT DOCUMENTS

| | | | |
|---|---|---|---|
| 3,888,815 | 6/1975 | Bessmer et al. | 260/37 |
| 4,460,739 | 7/1984 | Ashby | 524/702 |
| 4,483,973 | 11/1984 | Lucas et al. | 528/21 |
| 4,506,058 | 3/1985 | Ashby et al. | 524/730 |
| 4,515,932 | 5/1985 | Chung | 528/16 |
| 4,517,337 | 5/1985 | Lockhart et al. | 524/859 |

Primary Examiner—Melvyn I. Marquis
Attorney, Agent, or Firm—William H. Pittman; James C. Davis, Jr.

[57] ABSTRACT

Polyalkoxysilyl-terminated polydiorganosiloxanes which are relatively stable in viscosity over prolonged storage periods are prepared by endcapping a silanol-terminated polydiorganosiloxane in the presence of a catalytic amount of an acidic amine salt which subsequently decomposes to substantially inert products, preferably an amine salt of formic acid, and in the absence of silicon-nitrogen compounds and enoxysilanes normally used as catalyst quenchers and scavengers. The products are useful for the preparation of scavenger-free room temperature vulcanizable compositions, particularly when combined with certain N-alkoxy-silylalkyl-substituted compounds as adhesion promoters.

22 Claims, No Drawings

POLYALKOXYSILYL-TERMINATED POLYDIORGANOSILOXANES, METHODS FOR THEIR PREPARATION, AND ROOM TEMPERATURE VULCANIZABLE COMPOSITIONS CONTAINING THEM

This application is a continuation-in-part of copending application Ser. No. 090,183, filed Aug. 27, 1987, now abandoned.

This invention relates to polydiorganosiloxane compositions and methods for their preparation and use. More particularly, it relates to improved room temperature vulcanizable compositions employing a novel class of polyalkoxy-terminated polydiorganosiloxanes.

Considerable attention has been directed in recent years to the development of improved one-package room temperature vulcanizable (hereinafter sometimes designated "RTV") compositions. Under ideal conditions, these compositions would be stable for an indefinite period when stored in the absence of moisture, and would promptly cure to a tack-free elastomer upon contact with moisture, including the relatively small proportions of water vapor present in the atmosphere.

In a typical RTV composition, the predominant constituent is a polydiorganosiloxane (hereinafter sometimes designated "silicone" for brevity) containing polyalkoxysilyl end groups, typically dialkoxyalkylsilyl groups. These groups may be formed in situ by incorporating in the RTV composition a silanol-terminated silicone and, as an endcapping reagent, a polyalkoxysilyl compound such as methyltrimethoxysilane or dimethyltetramethoxydisilazane, which undergo reaction to produce the polyalkoxysilyl-terminated species. It is generally more efficient, however, to employ a previously formed polyalkoxysilyl-terminated silicone prepared by the same reaction.

In either case, the polyalkoxysilyl-terminated species is capable of being crosslinked by atmospheric moisture in the presence of a suitable metal-containing catalyst, usually an aluminum, titanium or tin compound. Disclosures of RTV compositions of this type are present in many patents and publications.

Early one-package RTV's employed silicones containing polyacyloxysilyl, typically polyacetoxysilyl, end groups. Upon curing, these materials release carboxylic acids such as acetic acid, which has a strong odor and whose presence is therefore undesirable. In later developments the acyloxy groups were replaced by alkoxy groups. However, it was found that compositions containing such alkoxy groups are converted to hydroxy-functional species as the composition is stored. Said hydroxy-functional species may react to produce by-products such as monoalkoxydialkylsilyl-terminated silicones, which are incapable of being crosslinked. They may also break down the silicone upon contact with the curing catalyst, and may inactivate the catalyst. The result is materials which cure slowly, if at all.

An improved class of RTV's containing polyalkoxysilyl-terminated silicones is disclosed in U.S. Pat. No. 4,395,526. It employs a compound which serves as a scavenger for hydroxy groups, typically a silicon-nitrogen compound or an enoxysilane.

A further development in the RTV art is represented by U.S. Pat. No. 4,515,932, which describes an improved method for endcapping silanol-terminated silicones to form polyalkoxysilyl-terminated silicones. In this method an acidic material is employed, optionally and often preferably in combination with an amine, as an endcapping catalyst. In Example 1 of that patent, a silanol-terminated silicone is capped by reaction with dimethyltetramethoxydisilazane in the presence of di-n-hexylamine and various acids including formic acid. The dimethyltetramethoxydisilazane functions under these conditions as both an endcapping reagent and a scavenger for hydroxy groups in the final RTV composition. However, the formic acid is disclosed as yielding a product which is endcapped to the extent of only 21%.

The presence of scavengers in the above-described compositions, while necessary, also causes problems. One obvious problem is the cost of the scavenger; such compounds are not readily available and are relatively expensive to prepare. Another problem is the formation of compounds such as ammonia or acetone as by-products of the scavenging reaction. Ammonia has an unpleasant odor and can cause corrosion of equipment or substrates. Acetone undergoes various reactions which introduce colored impurities into the RTV composition.

A scavenger-free one-package RTV composition is disclosed in U.S. Pat. No. 4,517,337. It employs a catalyst such as dibutyltin bis(acetylacetonate), which is stable in the presence of hydroxy species such as methanol and silanol-terminated silicones and may therefore be employed without scavengers. This is a significant advance in the RTV art.

A further problem, however, is encountered in endcapping operations which employ as a catalyst the combination of an acidic material and an amine. Such readily available acids as acetic acid, when used for this purpose, afford polyalkoxysilyl-terminated silicones with excellent viscosity and other properties for incorporation in RTV compositions. However, the viscosities of such silicones typically decrease substantially upon storage. For example, a typical silanol-terminated polydimethylsiloxane reacts with methyltrimethoxysilane in the presence of di-n-butylamine and acetic acid to produce an endcapped product which, upon accelerated aging in the absence of air at 100° C. for 3 days, decreases in viscosity by 99%. Such viscosity loss over time may render an RTV composition difficult or impossible to use.

Viscosity loss of this type is typically inhibited by quenching the endcapping catalyst after the endcapping reaction has proceeded. Among the compounds known to be useful for quenching are those disclosed hereinabove as scavengers; hexamethyldisilazane is typical. Inclusion of such compounds is a return to precisely the problems caused by scavengers: formation of by-products which may have an undesirable odor or may lead to color formation in the RTV.

It is also necessary in many circumstances to improve the adhesion of RTV's to various substrates. In particular, adhesion to metals such as aluminum and steel is often poor.

The present invention provides a novel class of polyalkoxysilyl-terminated silicones which are relatively stable in viscosity over prolonged storage periods. Also provided is a method for making such silicones which employs a highly effective catalyst, as well as shelf-stable one-package RTV's containing them, said RTV's being free of scavenging and quenching compounds. Finally, there is provided a series of RTV's which incorporate effective adhesion promoters.

The invention is based in large part on the discovery of a class of compounds useful as endcapping catalysts which are converted under the conditions prevailing in the endcapping reaction mixture to products ineffective to decrease the viscosity of the polyalkoxysilyl-terminated silicone. These products are typically carboxylic acid amides and/or esters, and they are typically formed at temperatures as low as 20°–25° C. It has been found, however, that such conversion is slow enough to enable said compounds to function efficiently as catalysts.

In one of its aspects, therefore, the present invention is a method for preparing a polyalkoxysilyl-terminated polydiorganosiloxane which comprises effecting reaction between the components of a mixture comprising at least one silanol-terminate polydiorganosiloxane and an effective amount of at least one polyalkoxysilane of the formula

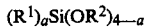 (1)

wherein $R^1$ is an unsubstituted or substituted hydrocarbon radical containing from 1 to about 13 carbon atoms, $R^2$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is 0 or 1; said reaction being conducted in the presence of a catalytic amount of an acidic amine salt which subsequently decomposes to substantially inert products, and said mixture being free of silicon-nitrogen compounds and enoxysilanes.

For the most part, the silanol-terminated polydiorganosiloxanes (silicones) used in the present invention have the formula

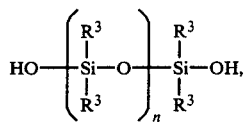 (II)

wherein each $R^3$ is independently an unsubstituted or substituted hydrocarbon radical containing about 1–13 carbon atoms and n is in the range of about 5–5000. Illustrative $R^3$ radicals are methyl, ethyl, phenyl, trifluoropropyl and vinyl. Alkyl radicals having up to about 4 carbon atoms and especially methyl radicals are preferred.

The polyalkoxysilane employed as an endcapping reagent is represented by formula I in which a is 0 or 1, most often 1. The $R^1$ radicals therein may be defined in the same terms as $R^3$ in formula II, with the same preferences. $R^2$ may be alkyl or the designated substituted alkyl radicals containing aryl, ethyl, ester, ketone or cyano substituents; it is also most often $C_{1-4}$ alkyl and especially methyl. Illustrative compounds of this type are methyltrimethoxysilane (which is usually preferred), methyltriethoxysilane, ethyltrimethoxysilane, tetraethoxysilane and vinyltrimethoxysilane.

An essential feature of the invention is the use as an endcapping catalyst of an acidic amine salt which subsequently decomposes to products which are substantially inert when contacted with polyalkoxysilyl-terminated silicones. By "acidic amine salt" is meant one which, when dissolved in water in substantially pure form, yields a solution with a pH below 7. The decomposition products are not themselves substantially acidic, since it has been found that acidic materials cause material viscosity decrease in such silicones when they remain in contact therewith. The products may, however, be functional derivatives of acids. Moreover, the acidic salts whose use is contemplated do not require contact with silicon-nitrogen compounds or enoxysilanes for inactivation, since an essential feature of the invention is the absence of the latter classes of materials.

A preferred class of acidic salts is the amine salts of formic acid. The identity of the amine is not critical but mono-, di- and trialkylamines are preferred, especially those in which the alkyl groups contain about 3–8 carbon atoms and most especially dialkylamines. The most preferred amines are di-n-butylamine and diisobutylamine. For the most part, di-(sec-alkyl)amines such as diisobutylamine have less tendency than di-(n-alkyl)amines to cause yellowing of RTV's cured with tin complexes such as dibutyltin bis(acetylacetonate).

The amine salt of formic acid may be previously prepared and incorporated in the reaction mixture, or it may be prepared in situ in said mixture by the addition of formic acid and a suitable amine. It is within the scope of the invention to employ an excess of either reagent, most often up to a molar ratio of about 15:1. It is frequently more advantageous to use the formic acid in excess than the amine, since it is converted to harmless alkyl formate by reaction with the polyalkoxysilane, as described hereinafter. Excess amine sometimes causes color to develop in the product.

Another essential feature of the invention is the absence from the reaction mixture of silicon-nitrogen compounds and enoxysilanes. In other words, none of the common scavenging or quenching compounds are required.

The endcapping reaction may be conducted by merely heating the above-described reaction mixture to a temperature within the range of about 50°–100° C. for a suitable period of time, typically about 0.5–2 hours, preferably with agitation. The use of diluents is within the scope of the invention but is seldom necessary or preferred.

The proportions of reagents employed in the method of this invention are not critical, but certain ranges of proportions are generally preferred. Most often, for each 100 parts by weight of silanol-terminated silicone there is employed about 0.5–10.0 parts of polyalkoxysilane and about 0.005–3.0 parts of acidic salt. When the catalyst is an amine salt of formic acid prepared in situ, the proportions of amine and formic acid per 100 parts of silicone are most often about 0.001–1.0 part and about 0.001–0.1 part, respectively. The formic acid may be employed in the form of a commercially available aqueous solution.

In general, stabilized product viscosities vary directly with reaction temperature and inversely with proportion of catalyst and endcapping reagent. For a high viscosity product, it is frequently preferred to employ temperatures in the range of about 70°–100° C. and catalyst and polyalkoxysilane levels in the range of about 0.05–0.30 and about 0.5–3.0 parts, respectively, per 100 parts of silanol-terminated silicone.

The degree of completion of the endcapping reaction can be determined by silicon-29 nuclear magnetic resonance spectroscopy. It can also be determined qualitatively by the "titanium coupling test", performed by adding a tetraalkyl titanate or zirconate. If a substantial proportion (i.e., greater than about 5%) of silanol-terminated silicone remains in the mixture, it reacts therewith to form a gel. Absence of gel formation indicates essentially complete reaction.

The polyalkoxysilyl-terminated silicones prepared by the method of this invention may be represented by the formula

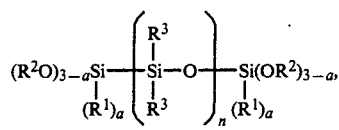

wherein $R^{1-3}$, a and n are as previously defined. Although their preparation is effected by a method which does not involve the use of catalyst quenching agents, they maintain substantially more stable viscosities than those prepared by using other acids as catalysts. They typically decrease in viscosity by 50% or less, most often no more than 25%, when stored for 3 days at 100° C. Such polyalkoxysilyl-terminated silicones are another aspect of the invention.

The conversion of amine salts of formic acid to nonacidic, harmless products under the conditions of the present invention has been established by numerous model reactions. For example, di-n-butylammonium formate and methyltrimethoxysilane react to form di-n-butylformamide, methanol and dimethyltetramethoxydisiloxane; the reaction is complete after 6 days at 60° C., while the corresponding reaction with acetic acid does not proceed measurably at temperatures below 100° C. Tertiary amine salts of formic acid form methanol, dimethyltetramethoxydisiloxane, methyl formate and a trialkylamine under similar conditions.

The reaction of dimethylamine with formic acid at 95° C. is known to produce dimethylformamide as the major product after 3 hours. Similarly, formic acid reacts with methyltrimethoxysilane at room temperature to produce methyl formate, methanol and dimethyltetramethoxydisiloxane, while the corresponding reaction with acetic acid requires a temperature of 100° C.

Finally, a model silane of the formula

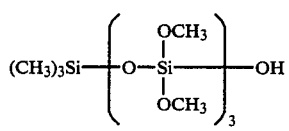

was found by gas chromatographic analysis to react with excess methyltrimethoxysilane in the presence of a catalytic amount of di-n-butylammonium formate to produce, after one hour at 70° C., various condensed silicones including 77% of the theoretical amount of the expected product of the formula

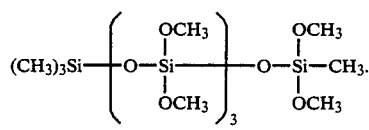

Also obtained, in 86% of the theoretical amount, was the expected N,N-di-n-butylformamide.

The preparation of the polyalkoxysilyl-terminated silicones of this invention is illustrated by the following examples. All parts in the examples herein are by weight. Viscosities are Brookfield viscosities at 25° C. Formic acid was undiluted unless otherwise specified.

EXAMPLES 1-2

Mixtures of 100 parts of two different silanol-terminated polydimethylsiloxanes, 2 parts of methyltrimethoxysilane, 0.3 part (2.33 mmol.) of di-n-butylamine and 0.003 part (0.57 mmol.) of 88% aqueous formic acid were heated at 70°-80° C. under nitrogen, with stirring, for 1 hour and cooled. The titanium coupling test showed that the reaction was essentially complete.

The products were heat-aged in a closed vessel for 3 days at 100° C., with Brookfield viscosity measurements being made at one-day intervals. The results are given in Table I, in comparison with the following controls:

Control A—a similar product prepared using 0.05 part (0.83 mmol.) of acetic acid.

Control B—a similar product prepared using 0.05 part of acetic acid, with 1 part of hexamethyldisilazane added as a quenching agent after 1 hour of reaction.

TABLE I

|  | Example 1 | Example 2 | Control A | Control B |
|---|---|---|---|---|
| Viscosity, poises |  |  |  |  |
| Before endcapping | 1840 | 245 | 1840 | 1840 |
| After endcapping |  |  |  |  |
| Immediately | 2120 | 320 | 3680 | 3080 |
| 1 day | 1700 | 310 | 140 | 2700 |
| 2 days | 1640 | 310 | 40 | 2600 |
| 3 days | 1580 | 310 | 24 | 2300 |
| Viscosity loss, % | 25 | 3 | 99 | 25 |

The listings in Table I show that the method of the present invention is effective to produce an endcapped polymer essentially equivalent to that produced by the use of acetic acid and hexamethyldisilazane as a quenching agent. It also shows the pronounced viscosity loss resulting from the use of acetic acid without quenching agent.

EXAMPLES 3-7

Mixtures of 100 parts of a silanol-terminated polydimethylsiloxane having a viscosity of 280 poises, 1.75 parts of methyltrimethoxysilane and 0.05 part of various preformed amine salts of formic acid were heated for 3 hours at 100° C. under nitrogen, with stirring. The final viscosities of the endcapped products thus obtained are given in Table II.

TABLE II

| Example | Amine | Viscosity, poises |
|---|---|---|
| 3 | Di-n-butylamine | 430 |
| 4 | Diisobutylamine | 400 |
| 5 | n-Octylamine | 340 |
| 6 | Triethylamine | 400 |
| 7 | Tri-n-butylamine | 600 |

EXAMPLE 8

A mixture of 100 parts of a silanol-terminated polydimethylsiloxane having a viscosity of 260 poises, 2 parts of methyltrimethoxysilane, 0.074 part (0.57 mmol.) of diisobutylamine and 0.026 part (0.57 mmol.) of formic acid was heated at 80° C. in a nitrogen atmosphere, with stirring, for 1½ hours. At the end of that time, the silicone was shown by silicon-29 nuclear magnetic resonance spectroscopy to be polymethoxysilyl-terminated;

its viscosity was 325 poises and remained stable after heat-aging in a closed vessel for 2 days at 100° C.

EXAMPLE 9

A mixture of 100 parts of the silanol-terminated polydimethylsiloxane of Example 2, 2.25 parts of methyltrimethoxysilane and 0.01 part of the diisobutylamine salt of formic acid was heated at 100° C. in a nitrogen atmosphere, with stirring, until endcapping was complete as shown by the titanium coupling test.

The polyalkoxysilyl-terminated silicones of this invention are useful as the reactive silicone constituents of RTV compositions. They may be used in any of such compositions known in the art which employ polyalkoxysilyl-terminated as opposed to silanol-terminated silicones.

A particularly advantageous area of application of the polyalkoxylsilyl-terminated silicones of this invention is in the preparation of scavenger-free RTV compositions containing organotin complexes as curing catalysts in combination with various adhesion promoters. Accordingly, another aspect of the invention is enoxysilane-free room temperature vulcanizable polydiorganosiloxane compositions comprising:

(A) at least one polyalkoxy-terminated polydiorganosiloxane of this invention, and (B) a catalytic amount of an organotin complex of the formula

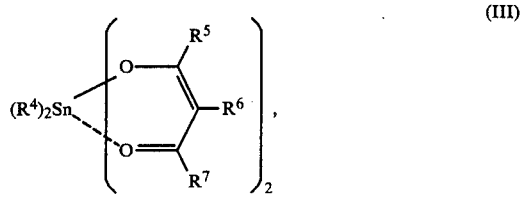

(III)

wherein $R^4$ is an unsubstituted or substituted hydrocarbon radical containing from 1 to about 18 carbon atoms and each of $R^5$, $R^6$ and $R^7$ is independently hydrogen, $R^4$, $Si(R^4)_3$, acyl or nitrile.

RTV compositions comprising components A and B, while being useful for many purposes, are sometimes deficient in adhesion to aluminum and steel surfaces. In a preferred aspect of the invention, said compositions also contain, as an adhesion promoter, (C) an effective amount of at least one compound selected from the group consisting of N-trialkoxysilylalkyl-substituted amides and imides, N-mono(trialkoxysilylalkyl)-substituted ureas, N,N'-bis(trialkoxysilylalkyl)-substituted ureas, trialkoxysilylalkyl isocyanurates and mono-(N-trialkoxysilylalkyl)alkylenediamines, or a combination thereof with (D) a cyanoalkyltrialkoxysilane; said adhesion promoter and any reaction products thereof being the only silicon-nitrogen compounds in said composition.

In the organotin complex which is component B in the RTV compositions of this invention, the $R^4$ radicals may be substituted or unsubstituted; they are usually unsubstituted. Alkyl radicals, especially those containing about 2-8 carbon atoms, are preferred, with n-butyl radicals being most preferred.

The complex portion of component B is derived from a diketone of the formula

The $R^5$ and $R^7$ radicals therein are most often alkyl radicals, especially methyl, and $R^6$ is usually hydrogen. Thus, the preferred diketone is acetylacetone. Organotin complexes of this type and RTV compositions employing them as catalysts are disclosed in the aforementioned U.S. Pat. No. 4,517,337, the disclosure of which is incorporated by reference herein.

Numerous organosilyl compounds useful as RTV adhesion promoters are known in the art; reference is made, for example, to U.S. Pat. Nos. 3,888,815, 4,472,590 and 4,483,973, the disclosures of which are also incorporated by reference herein. In its broadest sense, the present invention includes the use of any of such compounds. However, a limited selection of such compounds is particularly advantageous by reason of providing an adhesion to unprimed aluminum surfaces greater than 35 millipascals with greater than 45% cohesive failure, as determined by the ASTM C794 adhesion-in-peel test procedure. It is these compounds, as defined hereinabove, that comprise component C. The preferred adhesion promoters are N-(3-triethoxysilylpropyl)urea, N,N'-bis(3-trimethoxysilylpropyl)urea, N-(3-triethoxysilylpropyl)-p-nitrobenzamide, tris(3-trimethoxysilylpropyl) isocyanurate, N-(3-trimethoxysilylpropyl)maleimide and N-(3-trimethoxysilylpropyl)ethylenediamine.

Component B and, preferably, component C are present in the RTV compositions of this invention in effective proportions to serve as catalysts and adhesion promoters, respectively. In general, about 0.1-10.0 parts by weight of component B and about 0.1-5.0 parts of component C may be employed per 100 parts of component A.

Adhesion promotion is frequently optimized if component C is employed in combination with (D) a cyanoalkyltrialkoxysilane, most often 2-cyanoethyltrimethoxysilane (hereinafter "CETMS") or 3-cyanopropyltrimethoxysilane, which acts as a synergist therefor. When employed, component D is usually present in the amount of about 0.1-5.0 parts per 100 parts of component A. Its presence is often particularly advantageous when component C is an amide, imide or amine.

The RTV compositions of the invention may also contain other constituents in common use in such compositions, including curing catalyst accelerators, scavengers, plasticizers, pigments and fillers. In particular, at least one of the following may be present, all proportions being per 100 parts of component A:

(E) about 0.05-5.0 parts of a diketone of formula IV;

(F) about 0.01-10.0 parts of at least one polyalkoxysilane of formula I;

(G) about 1-50 parts of a plasticizer;

(H) about 5-700 parts of at least one filler; and (J) about 0.1-5.0 parts of an amine or guanidine as a curing accelerator.

Components E and F are often particularly preferred other constituents. Their presence contributes to the shelf stability of the RTV composition in the absence of moisture and its rapidity of cure in the presence of moisture.

The presence of component G is also frequently preferred. Suitable plasticizers useful as component G include trialkylsilyl-terminated polydiorganosiloxanes of the formula

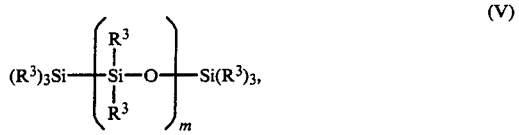

wherein $R^3$ is as previously defined and m is in the range of about 25–5000.

The presence or absence of component H, the filler, will depend to some extent on the intended use of the RTV composition. When the composition is to be used as a construction sealant or caulking compound, relatively large proportions of filler may be employed. For other uses, minor proportions of filler or no filler may be advisable. Suitable fillers include reinforcing materials such as silica aerogel, fumed silica, precipitated silica, glass fibers, titanium dioxide, zirconium silicate, iron oxide, calcium carbonate, diatomaceous earth and carbon black, and extending materials such as ground quartz and polyvinyl chloride, as well as mixtures thereof. It is frequently advantageous to pretreat a silica filler with an activating agent such as octamethylcyclotetrasiloxane.

Various amines and guanidines, optionally alkoxysilyl-substituted, may be used as curing accelerators (component J). Suitable accelerators are disclosed in the aforementioned U.S. Pat. No. 4,517,337. An advantage of the present invention, however, is that such accelerators are generally not required.

The preparation and properties of RTV compositions of the present invention is illustrated by the following examples. All compositions were prepared by conventional high-shear mixing techniques in a nitrogen atmosphere, under the equivalent of "dry box" conditions. Tack-free times (hereinafter "TFT") and other properties were determined by art-recognized test methods; those expressed in metric units were calculated from English units.

EXAMPLE 10

An RTV composition was prepared from 100 parts of the polyalkoxysilyl-terminated silicone of Example 8, 0.68 part of methyltrimethoxysilane, 16 parts of octamethylcyclotetrasiloxane-treated fumed silica and 23 parts of a trimethylsilyl-terminated polydimethylsiloxane oil having a Brookfield viscosity of 1 poise (corresponding to formula V wherein $R^2$ is methyl and n is about 80). There were subsequently added 0.92 part of dibutyltin bis(acetylacetonate), 0.35 part of acetylacetone and 1.05 parts of methyltrimethoxysilane. TFT values were determined before and after heat aging for 48 hours at 100° C. Other physical properties were determined after 14 days of cure at 50% relative humidity, immediately and after a similar heat aging period. The results are given in Table III.

TABLE III

| | Before aging | After aging |
|---|---|---|
| TFT, min. | 45 | 30 |
| Shore A hardness | 22 | 19 |
| Tensile strength, millipascals | 1540 | 251 |
| Elongation at break, % | 337 | 373 |

The tabulated results show the substantial shelf stability of the RTV compositions of this invention.

EXAMPLE 11

To the polymethoxysilyl-terminated silicone of Example 9 were added 0.30 part of dibutyltin bis(acetylacetonate), 0.30 part of acetylacetone and 0.50 part of methyltrimethoxysilane. The TFT and yellowness index (YI) of the product were determined immediately after mixing and after various heat aging periods at 100° C. YI values were determined using a colorimeter. For visual comparison, a YI value on the order of 2–3 represents a material which is colorless to the human eye, while a value of 10 represents a material which is distinctly yellow.

The results are given in Table IV, in comparison with controls employing polymethoxysilyl-terminated silicones and other ingredients as in Example 9, except as follows:

Control A—the amine salt of formic acid was replaced by 0.30 part of di-n-butylamine.

Control B—the amine salt of formic acid was replaced by 0.30 part of di-n-butylamine and 0.05 part of acetic acid.

Control C—2 parts of hexamethyldisilazane was added to Control B after endcapping was complete.

Control D—0.30 part of diisobutylamine was substituted for the di-n-butylamine of Control C.

For all materials except control A, endcapping was complete after 1 hour at 100° C.; in Control A, at least 12 hours was required.

The test results are given in Table IV.

TABLE IV

| | Ex. 11 | A | B | C | D |
|---|---|---|---|---|---|
| TFT, min.: | | | | | |
| Initial | 25 | 20 | 55 | 45 | 55 |
| 12 hours | 20 | 20 | 60 | 45 | 60 |
| 36 hours | 25 | 25 | 75 | 55 | 55 |
| 60 hours | 25 | 35 | 180 | 55 | 75 |
| 84 hours | 30 | 120 | * | 60 | 240 |
| YI: | | | | | |
| Initial | 0.9 | 1.4 | 1.3 | 3.4 | 1.2 |
| 12 hours | 1.0 | 3.6 | 7.0 | 6.5 | 2.6 |
| 36 hours | 0.9 | 4.5 | 9.2 | 7.5 | 3.7 |
| 60 hours | 0.8 | 5.6 | 11.0 | 9.3 | 4.8 |
| 84 hours | 0.8 | 8.9 | 25.0 | 15.5 | 7.8 |

*Did not cure.

From the foregoing, it is apparent that the RTV compositions of the present invention are substantially more shelf stable than those of the controls, with respect both to TFT and YI.

EXAMPLES 12–17

RTV compositions were prepared by initially blending 100 parts of the polymethoxysilyl-terminated silicone of Example 8, 0.68 part of methyltrimethoxysilane, 16 parts of octamethylcyclotetrasiloxane-treated fumed silica and 23 parts of the trimethylsilyl-terminated silicone oil of Example 10, and subsequently adding 0.42 part of dibutyltin bis(acetylacetonate), 0.35 part of acetylacetone, 0.35 part of methyltrimethoxysilane and various proportions of adhesion promoters, alone or in combination with CETMS. TFT values were determined initially and after 48 hours of heat aging at 100° C. Adhesion-in-peel values on unprimed aluminum were determined according to ASTM test method C794 after 7 to 14 days of cure at 50% relative humidity, and are reported in millipascals.

The results are given in Table V, in comparison with a control in which no adhesion promoter was employed.

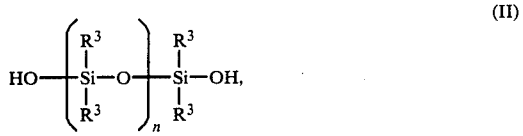

wherein each $R^3$ is independently an unsubstituted or

TABLE V

| Example | Adhesion promoter Identity | Parts | CETMS parts | TFT Init. | TFT 48 hr. | Adhesion, millipascals | Cohesive failure, % |
|---|---|---|---|---|---|---|---|
| 12 | Tris(3-trimethoxysilylpropyl) isocyanurate | 1.4 | — | 45 | 45 | 195.8 | 89 |
| 13 | N—(3-trimethoxysilylpropyl)urea | 0.7 | — | 90 | 90 | 119.3 | 100 |
| 14 | N—(3-trimethoxysilylpropyl)-p-nitrobenzamide | 0.7 | 1.0 | 40 | 45 | 110.3 | 47 |
| 15 | N,N'—bis(3-trimethoxysilylpropyl)urea | 0.7 | — | 25 | 30 | 149.6 | 100 |
| 16 | N—(3-trimethoxysilylpropyl)maleimide | 0.7 | 1.0 | — | — | 35 | 50 |
| 17 | N—(3-trimethoxysilylpropyl)-ethylenediamine | 0.7 | 1.0 | — | — | 35 | 50 |
| Control | — | — | — | 45 | 45 | 35 | 0 |

It is apparent from the results in Table V that the RTV compositions of this invention, employing the specific adhesion promoters previously described, are comparable to the control in TFT in substantially superior in adhesion properties. Numerous other control examples employing a wide variety of commercially available adhesion promoters demonstrated adhesion values of less than 35 millipascals and cohesive failure values of less than 50%.

The accelerated aging results reported hereinabove appear to parallel closely the results obtained after prolonged room temperature storage. For example, the composition of Example 12 cured satisfactorily after 6 months at room temperature.

What is claimed is:

1. A method for preparing a polyalkoxysilyl-terminated polydiorganosiloxane which comprises effecting reaction between the compnents of a mixture comprising at least one silanol-terminated polydiorganosiloxane and an amount effective for endcapping thereof of at least one polyalkoxysilane of the formula $$(R^1)_a Si(OR^2)_{4-a} \quad (1)$$

wherein $R^1$ is an unsubstituted or substituted hydrocarbon radical containing from 1 to about 13 carbon atoms, $R^2$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is for 0 or 1; said reaction being conducted in the presence of a catalytic amount of an acidic amine salt which subsequently decomposes to substantially inert products, and said mixture being free of silicon-nitrogen compounds and enoxysilanes.

2. A method according to claim 1 wherein the acidic salt is an amine salt of formic acid.

3. A method according to claim 2 wherein the silanol-terminated polydiorganosiloxane has the formula substituted hydrocarbon radical containing about 1–13 carbon atoms and n is in the range of about 5–5000.

4. A method according to claim 3 wherein the amine is a dialkylamine.

5. A method according to claim 4 wherein each $R^3$ is methyl and the polyalkoxysilane is methyltrimethoxysilane and is employed in the amount of about 0.5–10.0 parts by weight per 100 parts of silanol-terminated polydiorganosiloxane.

6. A method according to claim 5 wherein the amine salt of formic acid is employed in the amount of about 0.005–3.0 parts by weight per 100 parts of silanol-terminated polydiorganosiloxane.

7. A method according to claim 6 wherein the amine is di-n-butylamine.

8. A method according to claim 6 wherein the amine is diisobutylamine.

9. A method according to claim 6 wherein the amine salt and methyltrimethoxysilane are employed in the amounts of about 0.05–0.30 and about 0.5–3.0 parts, respectively, per 100 parts of silanol-terminated polydiorganosiloxane.

10. A method according to claim 5 wherein the amine salt of formic acid is prepared in situ in said mixture by the addition of formic acid and an amine.

11. A method according to claim 10 wherein the amine and formic acid are employed in the amounts of about 0.001–1.0 part and about 0.001–0.1 part by weight, respectively, per 100 parts of silanol-terminated polydiorganosiloxane.

12. A composition characterized by a viscosity decrease of 50% or less when stored for 3 days at 100° C., said composition comprising polyalkoxysilyl-terminated polydiorganosiloxanes and substantially inert decomposition products of an acidic amine salt and being free of silicon-nitrogen compounds and enoxysilanes; said polyalkoxysilyl-terminated polydiorganosiloxanes having the formula

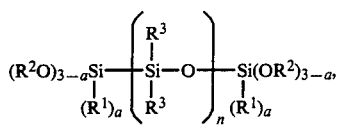

wherein $R^1$ is an unsubstituted or substituted hydrocarbon radical containing from 1 to about 13 carbon atoms, $R^2$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is 0 or 1.

13. A composition according to claim 12 which comprises polymethoxysilyl-terminated polydimethylsiloxanes.

14. An enoxysilane-free room temperature vulcanizable polydiorganosiloxane composition comprising:
(A) a composition according to claim 12, and
(B) a catalytic amount of an organotin complex of the formula

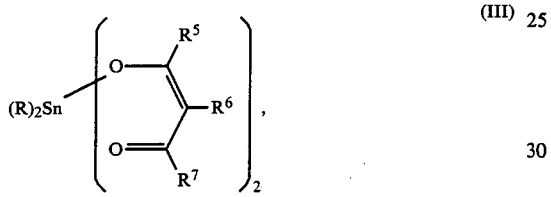

wherein $R^4$ is an unsubstituted or substituted hydrocarbon radical containing from 1 to about 18 carbon atoms and each of $R^5$, $R^6$ and $R^7$ is independently hydrogen, $R^4$, $Si(R^4)_3$, acyl or nitrile.

15. A composition according to claim 14 which also contains, as an adhesion promoter, (C) an effective amount of at least one compound selected from the group consisting of N-trialkoxysilylalkyl-substituted amides and imides, N-mono(trialkoxysilylalkyl)-substituted ureas, N,N'-bis(trialkoxysilylalkyl)-substituted ureas, trialkoxysilylalkyl isocyanurates, mono-(N-trialkoxysilylalkyl)alkylenediamines, and combinations thereof with (D) a cyanoalkyltrialkoxysilane, said adhesion promoter and any reaction products thereof being the only silicon-nitrogen compounds in said composition.

16. A composition according to claim 15 wherein component B is dibutyltin bis(acetylacetonate) and is employed in the amount of about 0.1–10.0 parts by weight per 100 parts of component A.

17. A composition according to claim 16 wherein component C is employed in the amount of about 0.1–5.0 parts by weight per 100 parts of component A.

18. A composition according to claim 17 wherein component C is tris(3-trimethoxysilylpropyl) isocyanurate, N-(3-trimethoxysilylpropyl)urea or N,N'-bis(3-trimethoxysilylpropyl)urea.

19. A composition according to claim 17 wherein component C is N-(3-trimethoxysilylpropyl)-p-nitrobenzamide, N-(3-trimethoxysilylpropyl)maleimide or N-(3-trimethoxysilylpropyl)ethylenediamine, and component D is 2-cyanoethyltrimethoxysilane and is employed in the amount of about 0.1–5.0 parts by weight per 100 parts of component A.

20. A composition according to claim 17 which also comprises at least one of the following, all proportions being per 100 parts of component A:
(E) about 0.05–5.0 parts of a diketone of the formula

(F) about 0.01–10.0 parts of at least one polyalkoxysilane of the formula $$(R^1)_a Si(OR^2)_{4-a} \tag{1}$$

wherein $R^1$ is an unsubstituted or substituted hydrocarbon radical containing from 1 to about 13 carbon atom, $R^2$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is 0 or 1;
(G) about 1–50 parts of a plasticizer comprising a trialkylsilyl-terminated polydiorganosiloxane of the formula

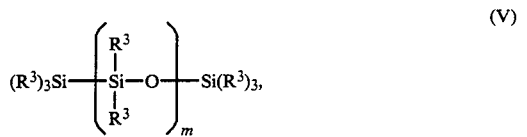

wherein $R^3$ is an unsubtituted or substituted hydrocarbon radical containing about 1–13 carbon atoms and m is in the range of about 25–5000;
(H) about 5–700 parts of at least one filler;
(J) about 0.1–5.0 parts of an amine as a curing accelerator.

21. A composition according to claim 20 which includes components E, F and G.

22. A composition according to claim 20 wherein $R^{1-3}$, $R^5$ and $R^7$ are each methyl, $R^4$ is n-butyl, $R^6$ is hydrogen and a is 1.

* * * * *